United States Patent
Meguriya et al.

(10) Patent No.: US 8,697,798 B2
(45) Date of Patent: Apr. 15, 2014

(54) SILICONE RUBBER COMPOSITION FOR USE AS HIGH-VOLTAGE INSULATOR AND POLYMER INSULATOR

(71) Applicants: Shin-Etsu Chemical Co., Ltd., Tokyo (JP); NGK Insulators, Ltd., Nagoya (JP)

(72) Inventors: Noriyuki Meguriya, Amstelveen (NL); Yoshiaki Koike, Annaka (JP); Osamu Hayashida, Annaka (JP); Takanori Kondo, Kasugai (JP); Tatsuya Kuroda, Komaki (JP)

(73) Assignees: Shin-Etsu Chemical Co., Ltd., Tokyo (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/828,795

(22) Filed: Mar. 14, 2013

(65) Prior Publication Data

US 2013/0266799 A1 Oct. 10, 2013

(30) Foreign Application Priority Data

Apr. 9, 2012 (JP) ................................. 2012-088307
May 29, 2012 (JP) ................................. 2012-121485

(51) Int. Cl.
*C08L 83/04* (2006.01)
*C08K 5/103* (2006.01)

(52) U.S. Cl.
USPC ........... 524/588; 524/283; 524/306; 524/308; 524/310; 524/315; 524/317; 524/318; 524/320; 524/321; 524/322; 528/15; 528/24; 528/32; 428/403; 428/405

(58) Field of Classification Search
None
See application file for complete search history.

(56) References Cited

U.S. PATENT DOCUMENTS

| | | | |
|---|---|---|---|
| 3,511,698 A | 5/1970 | Talcott | |
| 3,965,065 A | 6/1976 | Elliott | |
| 4,476,155 A | 10/1984 | Niemi | |
| 5,519,080 A | 5/1996 | Matsushita et al. | |
| 5,691,407 A | 11/1997 | Azechi et al. | |
| 5,973,047 A | 10/1999 | Ernst et al. | |
| 5,977,216 A | 11/1999 | Meguriya et al. | |
| 5,994,461 A | 11/1999 | Nakamura et al. | |
| 6,251,990 B1 * | 6/2001 | Meguriya et al. | 524/862 |
| 7,385,000 B2 * | 6/2008 | Kuhn et al. | 524/588 |
| 8,440,312 B2 * | 5/2013 | Elahee | 428/447 |

FOREIGN PATENT DOCUMENTS

| | | |
|---|---|---|
| DE | 294 812 A5 | 10/1991 |
| DE | 196 13 204 A1 | 10/1996 |
| EP | 0645779 B1 | 11/1999 |
| EP | 1 079 398 A2 | 2/2001 |
| JP | 53-35982 B | 9/1978 |
| JP | 59-198604 A | 11/1984 |
| JP | 7-57574 A | 3/1995 |
| JP | 8-259820 A | 10/1996 |
| JP | 11-12470 A | 1/1999 |
| JP | 11-152408 A | 6/1999 |

OTHER PUBLICATIONS

Extended European Search Report issued Sep. 4, 2013, in European Patent Application No. 13159906.0.

* cited by examiner

*Primary Examiner* — Marc Zimmer
(74) *Attorney, Agent, or Firm* — Birch, Stewart, Kolasch & Birch, LLP

(57) ABSTRACT

A silicone rubber composition comprising (A) an organopolysiloxane composition of the organic peroxide cure or addition reaction cure type, (B) a normally solid organic compound having at least two ester bonds per molecule, and (C) particulate aluminum hydroxide having an average particle size of up to 20 µm is suited for use as high-voltage electric insulator since it maintains insulating properties for a long term in outdoor service and has acid resistance and a long lifetime even in polluted areas.

9 Claims, No Drawings

SILICONE RUBBER COMPOSITION FOR USE AS HIGH-VOLTAGE INSULATOR AND POLYMER INSULATOR

CROSS-REFERENCE TO RELATED APPLICATION

This non-provisional application claims priority under 35 U.S.C. §119(a) on Patent Application Nos. 2012-088307 and 2012-121485 filed in Japan on Apr. 9, 2012 and May 29, 2012, respectively, the entire contents of which are hereby incorporated by reference.

TECHNICAL FIELD

This invention relates to a silicone rubber composition which cures into a silicone rubber serving as high-voltage electric insulator, and a polymer insulator using the same.

BACKGROUND ART

In general, high-voltage electrical insulating materials for use as insulators and bushings for power transmission lines or the like are of porcelain (ceramics) or glass. Since these insulators are heavy and liable to breakage due to a lack of impact resistance, they require careful handling and impose a burden to workers. In a pollutive environment as in seaside areas and industrial areas, there is a tendency that dust, salt and mist in particulate form attach to the surface of high-voltage electrical insulators, causing leakage currents and dry band discharge leading to flashover failure.

In order to eliminate the drawbacks of porcelain and glass insulators, a number of proposals were made. For example, U.S. Pat. No. 3,511,698 discloses a weathering resistant high-voltage electrical insulator comprising a member of thermosetting resin and a platinum catalyst-containing organopolysiloxane elastomer. JP-A S59-198604 proposes a one-part room temperature curable organopolysiloxane composition which is applied to the outer surface of an electrical insulator of glass or porcelain so that the electrical insulator may maintain its high insulating properties even in the presence of moisture, air pollutants, ultraviolet radiation and other outdoor stresses.

JP-B S53-035982 discloses that a silicone rubber composition with improved electrical insulation is obtained by heating a mixture of an organopolysiloxane capable of heat curing into silicone rubber and aluminum hydroxide at temperatures above 100° C. for more than 30 minutes. JP-A H07-057574 describes that the blending of a methylalkylsiloxane fluid in silicone rubber is effective for providing contact angle recovery with time and preventing flashover failure.

However, the silicone rubber materials used in the prior art techniques mentioned above are not yet fully satisfactory in high-voltage electrical insulation. They must be loaded with large amounts of aluminum hydroxide in order to improve the electrical insulation. Aluminum hydroxide, however, is so hydrophilic that it may degrade electrical properties in a humid environment. Solutions to this problem include surface treatment of aluminum hydroxide as disclosed in JP-A H08-259820, and aluminum hydroxide bearing a specific amount of alkenyl group on surface as disclosed in JP-A H11-152408. Also JP-A H11-012470 proposes an addition cure silicone rubber composition having an organopolysiloxane resin added thereto.

These compositions, however, still suffer from problems. On use in acidic industrial areas, high-voltage applications, or serious pollution areas, corona discharge can occur to form acid. This often invites degradation of silicone rubber.

CITATION LIST

Patent Document 1: U.S. Pat. No. 3,511,698
Patent Document 2: JP-A S59-198604 (U.S. Pat. No. 4,476, 155)
Patent Document 3: JP-B S53-035982 (U.S. Pat. No. 3,965, 065)
Patent Document 4: JP-A H07-057574 (U.S. Pat. No. 5,519, 080, EP 0645779)
Patent Document 5: JP-A H08-259820 (U.S. Pat. No. 5,691, 407)
Patent Document 6: JP-A H11-152408 (U.S. Pat. No. 5,977, 216)
Patent Document 7: JP-A H11-012470

DISCLOSURE OF INVENTION

An object of the invention is to provide a silicone rubber composition for use as high-voltage electrical insulators, which cures into a silicone rubber that maintains its performance for a long term on outdoor use, and exhibits high acid resistance and a long lifetime even on use in serious pollution areas. Another object is to provide a polymer insulator using the silicone rubber composition.

The inventors have found that a cured product of a silicone rubber composition comprising (A) an organopolysiloxane composition of the organic peroxide cure or addition reaction cure type, (B) an organic compound having at least two ester bonds, and (C) particulate aluminum hydroxide having an average particle size of up to 20 μm is useful as a high-voltage electric insulator because it has sufficient acid resistance to withstand long-term service in high-voltage applications and in serious pollution areas.

In one aspect, the invention provides a silicone rubber composition for use as high-voltage electric insulator, comprising
(A) 100 parts by weight of an organopolysiloxane composition of the organic peroxide cure or addition reaction cure type,
(B) 0.15 to 20 parts by weight of an organic compound having at least two ester bonds per molecule and being solid at room temperature (25° C.), and
(C) 30 to 400 parts by weight of particulate aluminum hydroxide having an average particle size of up to 20 μm.

In a preferred embodiment, the organic compound (B) is a straight or branched aliphatic or aromatic hydrocarbon compound which may contain an ether bonding oxygen atom (—O—) and may have a hydroxyl group at a molecular side chain or end. More preferably, the organic compound (B) is an ester of polyhydric alcohol with long-chain carboxylic acid having at least 8 carbon atoms or an ester of polyfunctional carboxylic acid with long-chain alcohol having at least 8 carbon atoms. Further preferably, the organic compound (B) has a melting point of up to 150° C.

In one preferred embodiment, component (A) is an organopolysiloxane composition of the organic peroxide cure type consisting of (a) 100 parts by weight of an organopolysiloxane having on average at least two alkenyl groups per molecule, represented by the average compositional formula (I):

$$R_a SiO_{(4-a)/2} \tag{I}$$

wherein R is a substituted or unsubstituted monovalent hydrocarbon group, 0.001 to 10 mol % of R being alkenyl, and at least 90 mol % of R being methyl, and a is a positive number of 1.9 to 2.4, and (b) a catalytic amount of an organic peroxide.

In another preferred embodiment, component (A) is an organopolysiloxane composition of the addition reaction cure type consisting of (c) 100 parts by weight of an organopolysiloxane having on average at least two alkenyl groups per molecule, represented by the average compositional formula (I):

$$R_aSiO_{(4-a)/2} \qquad (I)$$

wherein R is a substituted or unsubstituted monovalent hydrocarbon group, 0.001 to 10 mol % of R being alkenyl, and at least 90 mol % of R being methyl, and a is a positive number of 1.9 to 2.4, (d) 0.1 to 30 parts by weight of an organohydrogenpolysiloxane having at least two silicon-bonded hydrogen atoms per molecule, and (e) a catalytic amount of an addition reaction catalyst.

In a preferred embodiment, aluminum hydroxide (C) is surface treated to be hydrophobic prior to or during compounding with component (A). Typically, aluminum hydroxide (C) is surface treated to be hydrophobic with an organosilazane and/or organosilane.

Also contemplated herein is a polymer insulator comprising a core and a silicone rubber layer formed on the core by molding and curing the silicone rubber composition defined above.

Advantageous Effects of Invention

The silicone rubber composition is applied and cured to the outer periphery of a core (typically a hollow or solid cylindrical molded part of heat resistant resin) and curing the composition, obtaining a polymer insulator molded in insulator or bushing shape. The insulator maintains electrical insulating performance for a long term on outdoor use, and exhibits high acid resistance and a long lifetime even on use in serious pollution areas.

DESCRIPTION OF PREFERRED EMBODIMENTS

Briefly stated, the invention is directed to a silicone rubber composition comprising (A) an organopolysiloxane composition of the organic peroxide cure or addition reaction cure type, (B) an organic compound having at least two ester bonds, and (C) particulate aluminum hydroxide having an average particle size of up to 20 μm In one preferred embodiment, component (A) is an organopolysiloxane composition of the organic peroxide cure type consisting of (a) an organopolysiloxane having on average at least two alkenyl groups per molecule, represented by the average compositional formula (I):

$$R_aSiO_{(4-a)/2} \qquad (I)$$

wherein R is a substituted or unsubstituted monovalent hydrocarbon group, 0.001 to 10 mol % of R being alkenyl, and at least 90 mol % of R being methyl, and a is a positive number of 1.9 to 2.4, and (b) an organic peroxide.

Component (a) is an organopolysiloxane having on average at least two alkenyl groups per molecule, represented by the average compositional formula (I) defined just above. In formula (I), R is a substituted or unsubstituted monovalent hydrocarbon group, preferably having 1 to 12 carbon atoms, more preferably 1 to 8 carbon atoms. Examples include aliphatic saturated hydrocarbon groups, typically alkyl groups such as methyl, ethyl, propyl, isopropyl, butyl, isobutyl, tert-butyl, hexyl, and cyclohexyl; aliphatic unsaturated hydrocarbon groups, typically alkenyl groups such as vinyl, allyl, propenyl and butenyl; aromatic hydrocarbon groups, typically aryl groups such as phenyl and xylyl; and halo and cyano-substituted hydrocarbon groups such as 3,3,3-trifluoropropyl. Substituent groups R may be the same or different as long as at least two alkenyl groups are included on average per molecule. Basically R in formula (I) may be any of the foregoing. Of the alkenyl groups, vinyl is preferred. Of the other substituent groups (substituted or unsubstituted monovalent hydrocarbon groups), methyl and phenyl are preferred. It is preferred that alkenyl account for 0.001 to 10 mol %, more preferably 0.01 to 5 mol %, and even more preferably 0.01 to 2 mol % of the entire R, and methyl account for at least 90 mol %, more preferably 95 to 99 mol % of the entire R. Most preferably all R groups excluding alkenyl are methyl. The alkenyl group may be bonded to a silicon atom at the end of the molecular chain or a silicon atom midway the molecular chain or both. Preferably the alkenyl group is bonded to a silicon atom at the end of the molecular chain.

The subscript "a" is a positive number of 1.9 to 2.4, preferably 1.98 to 2.02, and more preferably 1.99 to 2.01. The organopolysiloxane may be either linear or branched inclusive of $RSiO_{3/2}$ units or $SiO_{4/2}$ units. Most often, it is desirably a linear organopolysiloxane having a backbone consisting of recurring diorganosiloxane units ($R_2SiO_{2/2}$) and capped with a triorganosiloxy group ($R_3SiO_{1/2}$) at both ends of the molecular chain. Herein, R is as defined above.

The organopolysiloxane may be prepared by any well-known methods. In one exemplary method, it is obtained from equilibration reaction between organocyclopolysiloxane and hexaorganodisiloxane in the presence of an alkali or acid catalyst.

Preferably the organopolysiloxane has a degree of polymerization of 100 to 20,000, more preferably 200 to 15,000, and most preferably 300 to 10,000. It is noted that the degree of polymerization (or average molecular weight) may be measured as weight average degree of polymerization (or weight average molecular weight) by gel permeation chromatography (GPC) versus polystyrene standards using toluene as developing solvent.

Component (b) is an organic peroxide serving as a catalyst for promoting crosslinking reaction of component (a). Any of prior art well-known peroxides may be used. Examples include, but are not limited to, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, t-butyl perbenzoate, and 1,1-bis(t-butylperoxycarboxy)hexane.

The amount of component (b) added may be selected as appropriate depending on the cure rate. Typically component (b) is added in an amount of 0.1 to 10 parts, preferably 0.2 to 2 parts by weight per 100 parts by weight of component (a). Outside the range, less amounts of component (b) may result in insufficient crosslinking and hence, poor rubber physical properties such as strength and elongation whereas excessive amounts may cause scorching and other problems.

In another preferred embodiment, component (A) is an organopolysiloxane composition of the addition reaction cure type consisting of (c) an alkenyl-bearing organopolysiloxane represented by formula (I), (d) an organohydrogenpolysiloxane having at least two silicon-bonded hydrogen atoms per molecule, and (e) an addition reaction catalyst. This composition cures into a rubbery elastomer when held at normal temperature (specifically 25° C.±10° C.) or when heated at elevated temperatures.

The alkenyl-bearing organopolysiloxane as component (c) is as illustrated and exemplified above for component (a).

Component (d) is an organohydrogenpolysiloxane having at least two, preferably at least three silicon-bonded hydrogen atoms (Si—H groups) per molecule. Preferably it is an organohydrogenpolysiloxane having the average compositional formula (II):

$$R^1{}_b H_c SiO_{(4-b-c)/2} \qquad (II)$$

wherein $R^1$ is a substituted or unsubstituted monovalent hydrocarbon group of 1 to 10 carbon atoms, b is a positive number of 0.7 to 2.1, c is a positive number of 0.001 to 1.0, and b+c is 0.8 to 3.0, which is liquid at normal temperature.

In formula (II), $R^1$ which may be the same or different is a substituted or unsubstituted monovalent hydrocarbon group of 1 to 10 carbon atoms, preferably 1 to 8 carbon atoms, and also preferably free of aliphatic unsaturation. Exemplary groups of $R^1$ include alkyl groups such as methyl, ethyl and propyl, cycloalkyl groups such as cyclohexyl, aryl groups such as phenyl and tolyl, aralkyl groups such as benzyl, 2-phenylethyl and 2-phenylpropyl, and substituted forms of the foregoing in which some or all hydrogen atoms are substituted by halogen atoms, such as 3,3,3-trifluoropropyl.

The subscript "b" is a positive number of 0.7 to 2.1, preferably 0.8 to 2.0, "c" is a positive number of 0.001 to 1.0, preferably 0.01 to 1.0, and the sum b+c is 0.8 to 3.0, preferably 0.9 to 2.7.

The organohydrogenpolysiloxane has at least 2 (specifically 2 to about 300) Si—H groups per molecule, preferably at least 3 (specifically 3 to about 200), and more preferably at least 4 (specifically 4 to about 100) Si—H groups per molecule. The Si—H group may be present at the end of the molecular chain and/or at a position midway the molecular chain. The preferred organohydrogenpolysiloxane is one in which the number of silicon atoms (i.e., degree of polymerization) is about 2 to about 300, more preferably about 3 to about 200, and even more preferably about 4 to about 100 per molecule, and has a viscosity at 25° C. of 0.5 to 1,000 mPa-s, more preferably 1 to 500 mPa-s, and even more preferably 5 to 300 mPa-s. Notably, the viscosity may be measured by a rotational viscometer, for example, BL, BH, BS or cone-plate type viscometer.

Examples of the organohydrogenpolysiloxane (d) include 1,1,3,3-tetramethyldisiloxane, 1,3,5,7-tetramethylcyclotetrasiloxane, methylhydrogencyclopolysiloxane, methylhydrogensiloxane/dimethylsiloxane cyclic copolymers, tris(dimethylhydrogensiloxy)methylsilane, tris(dimethylhydrogensiloxy)phenylsilane, trimethylsiloxy-endcapped methylhydrogenpolysiloxane, trimethylsiloxy-endcapped dimethylsiloxane/methylhydrogensiloxane copolymers, dimethylhydrogensiloxy-endcapped methylhydrogenpolysiloxane, dimethylhydrogensiloxy-endcapped dimethylpolysiloxane, dimethylhydrogensiloxy-endcapped dimethylsiloxane/methylhydrogensiloxane copolymers, trimethylsiloxy-endcapped methylhydrogensiloxane/diphenylsiloxane copolymers, trimethylsiloxy-endcapped methylhydrogensiloxane/diphenylsiloxane/dimethylsiloxane copolymers, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units and $(C_6H_5)SiO_{3/2}$ units, and substituted forms of the foregoing in which some or all methyl groups are substituted by other alkyl groups or phenyl groups. It is noted that the term "endcapped" means that a siloxane is capped at both ends of the molecular chain with the referenced groups, unless otherwise stated.

The organohydrogenpolysiloxane (d) is added in an amount of 0.1 to 30 parts, preferably 0.3 to 10 parts by weight per 100 parts by weight of the organopolysiloxane (c). Differently stated, the organohydrogenpolysiloxane (d) is added in such an amount that the molar ratio of Si—H groups in component (d) to total alkenyl groups in component (c) and component (B) to be described later may be 0.5/1 to 5/1, preferably 0.8/1 to 3/1, and more preferably 1/1 to 2.5/1. Outside the range, less amounts of component (d) may result in insufficient crosslinking and hence, poor rubber physical properties such as strength and elongation whereas excessive amounts may offer too much crosslinking sites or too high crosslinking density, also resulting in poor rubber physical properties.

Component (e) is an addition reaction catalyst, examples of which include platinum-based catalysts such as platinum black, platinic chloride, chloroplatinic acid, the reaction product of chloroplatinic acid with monohydric alcohol, chloroplatinic acid-olefin complexes, and platinum bisacetoacetate, palladium-based catalysts, and rhodium-based catalysts. The catalyst may be used in a catalytic amount, which is typically 0.5 to 1,000 ppm, specifically 1 to 500 ppm of platinum group metal based on the total weight of components (c) and (d).

Component (B) is an organic compound having at least two ester bonds per molecule and being solid at room temperature (25° C.). It is typically a hydrocarbon compound optionally containing one or more heteroatoms such as oxygen, nitrogen, sulfur and/or halogen. It is essential for improving the acid resistance of the insulating material.

The organic compound may be either monomer, oligomer or polymer having any molecular weight and a linear, branched, cyclic or otherwise structure as long as it has at least two ester bonds per molecule and is solid at room temperature (25° C.). Besides the ester bond sites, the compound may contain an oxygen atom as an ether bond (—O—), amide bond, urethane bond or the like. Likewise, the compound may contain atoms other than oxygen, for example, nitrogen, halogen (e.g., fluorine and chlorine), and sulfur atoms. Preferably the compound is a linear or branched aliphatic or aromatic hydrocarbon compound which may contain an ether bonding oxygen atom and which may have a hydroxyl group at a molecular side chain or end.

Also preferably, the organic compound (B) is an ester of polyfunctional carboxylic acid with alcohol or an ester of polyhydric alcohol with carboxylic acid. As long as the compound has at least two ester bonds (—C(=O)—O—) per molecule, it may be either an ester compound in which carboxylic acid and alcohol available in the molecule are reacted in entirety to form ester bonds or an ester compound in which carboxylic acid and alcohol available in the molecule are reacted in part to form ester bonds (namely, partially esterified product of polyfunctional carboxylic acid or partially esterified product of polyhydric alcohol). Suitable polyfunctional carboxylic acids include succinic acid, adipic acid, maleic acid, fumaric acid, tartaric acid, malic acid, and citric acid. Suitable polyhydric alcohols include ethylene glycol, diethylene glycol, polyethylene glycol, glycerol, pentaerythritol, sorbitol, and sucrose. The alcohol and carboxylic acid to be reacted therewith are not particularly limited, while each may be a single compound or a mixture. Examples of the alcohol which forms an ester bond with the polyfunctional carboxylic acid include lower or higher saturated alcohols of $C_nH_{2n+1}OH$ (wherein n=1 to 25, specifically 10 to 18), such as methyl alcohol, ethyl alcohol, propyl alcohol, hexyl alcohol, octyl alcohol, lauryl alcohol, myristyl alcohol, cetyl alcohol, and stearyl alcohol, unsaturated alcohols such as linoleyl alcohol and oleyl alcohol, aromatic alcohols such as benzyl alcohol, and polyhydric alcohols. Inter alia, higher saturated alcohols of at least 8 carbon atoms, especially 10 to 18 carbon atoms are preferred. Examples of the carboxylic acid which forms an ester bond with the polyhydric alcohol include lower or higher saturated fatty acids of $C_mH_{2m+1}COOH$ (wherein m=1 to 25, specifically 10 to 18), such as acetic acid, propionic acid, valeric acid, octanoic acid, decanoic acid, lauric acid, myristic acid, palmitic acid, and stearic acid, unsaturated fatty acids such as acrylic acid, linoleic acid, and oleic acid, aromatic carboxylic acids such as benzoic acid, and polyfunctional carboxylic acids. Inter alia, higher saturated fatty acids of at least 8 carbon atoms, especially 10 to 18 carbon atoms are preferred.

Also the compound having ester bonds may be a product from reaction of carboxylic acid with alcohol, or reaction thereof with acid halide or acid anhydride, or from transesterification or other reaction. Alternatively, any naturally occurring compounds may be used.

The organic compound must be in a solid state at normal temperature. If the organic compound is liquid at normal temperature, it will bleed out of the cured rubber, which thus degrades its performance with the lapse of time. Preferably the organic compound has a melting or softening point of up to 150° C., more preferably up to 120° C. A compound with a melting or softening point in excess of 150° C. may not be effectively dispersed in the composition, resulting in the cured composition having a mottled outer appearance and degraded performance.

The organic compound (B) is blended in an amount of 0.15 to 20 parts, preferably 0.3 to 15 parts, more preferably 0.45 to 15 parts, even more preferably 0.75 to 10 parts, and most preferably 0.95 to 5 parts by weight per 100 parts by weight of component (A). Outside the range, less amounts of organic compound (B) lead to insufficient acid resistance and a shorter lifetime whereas excessive amounts adversely affect rubber physical properties and are uneconomical.

The organic compound may be compounded with component (A) and other components using a mixing or agitating machine such as planetary mixer, or a two-roll mill. It may be compounded at room temperature or dispersed at an elevated temperature of up to 200° C.

Component (C) is particulate aluminum hydroxide having an average particle size of up to 20 μm. It is essential for improving the electrical insulating properties of silicone rubber such as arc resistance and tracking resistance. The aluminum hydroxide represented by the formula: $Al_2O_3.3H_2O$ should have an average particle size of up to 20 μm, specifically 0.1 to 20 μm, and preferably 0.5 to 15 μm and a BET specific surface area of preferably 1.0 to 10 $m^2/g$. If the average particle size of aluminum hydroxide exceeds 20 μm, the resulting composition has degraded rubber physical properties and poor acid resistance. As used herein, the "average particle size" is determined as a weight average diameter $D_{50}$ (i.e., a particle diameter at 50% by weight cumulative, or median diameter) by a particle size distribution measurement meter based on the laser diffractometry. The aluminum hydroxide may be a single species, or a mixture of two or more species having different average particle size or BET specific surface area.

The particulate aluminum hydroxide may be used as such, but preferably subjected to hydrophobic treatment on their surface. Suitable surface treating agents include organosilazanes such as alkylsilazanes and vinylsilazanes, and organosilanes such as alkylalkoxysilanes, vinylalkoxysilanes, alkylchlorosilanes, and vinylchlorosilanes. Specific examples include organosilazanes such as hexamethyldisilazane, diphenyltetramethyldisilazane, and divinyltetramethyldisilazane; organoalkoxysilanes such as methyltrimethoxysilane, methyltriethoxysilane, phenyltrimethoxysilane, dimethyldimethoxysilane, vinyltrimethoxysilane, vinyltriethoxysilane, divinyldimethoxysilane, vinylmethyldimethoxysilane, and vinyltris(methoxyethoxy)silane; organochlorosilanes such as methyltrichlorosilane, phenyltrichlorosilane and vinyltrichlorosilane; partial hydrolyzates thereof, and siloxane oligomers having a functional group such as Si—OH or Si—OR' group (wherein R' is a monovalent hydrocarbon group, typically alkyl) at the end of the molecular chain and having a degree of polymerization of up to 50, alone or in admixture of two or more.

The surface treatment may be performed by various methods. In one method, aluminum hydroxide particles are treated before they are blended with components (A), (B) and the like. Alternatively, aluminum hydroxide particles and the surface treating agent are mixed with a part or all of component (A) and/or (B), whereby surface treatment of aluminum hydroxide is performed during the mixing step. The aluminum hydroxide is preferably surface treated to a degree which corresponds to 0.01 to 2% by weight, more preferably 0.02 to 1% by weight of carbon based on the weight of aluminum hydroxide. Such a degree of surface treatment is selected from the standpoint of improving compatibility with siloxane. The carbon content may be measured by a carbon analyzer relying on the measurement of $CO_2$ emission from oxidative combustion.

The aluminum hydroxide (C) is compounded in an amount of 30 to 400 parts, preferably 50 to 300 parts by weight per 100 parts by weight of component (A). Less than 30 parts of component (C) fails to provide sufficient electrical properties such as tracking resistance. More than 400 parts of component (C) is difficult to blend, and such a heavily loaded composition is difficult to work and becomes hard and brittle in the cured state.

In addition to components (A) to (C), an inorganic filler may be blended in the silicone rubber composition, if desired, for the purposes of adjusting the flow of the composition and improving the mechanical strength of molded parts. Insofar as the objects of the invention are not impaired, the inorganic filler may be added in an amount of preferably up to 100 parts by weight (specifically 0 to 100 parts), more preferably up to 50 parts by weight (specifically 0 to 50 parts) per 100 parts by weight of component (A). Suitable fillers include reinforcing fillers such as precipitated silica, fumed silica, fired silica, and fumed titania, and non-reinforcing fillers such as ground quartz, diatomaceous earth, asbestos, aminosilicic acid, iron oxide, zinc oxide, and calcium carbonate. These fillers may be used as such or after surface treatment with organosilicon compounds such as hexamethylsilazane, trimethylchlorosilane and polymethylsiloxane. If necessary, other optional components may be blended, for example, dispersants (or wetters), reaction inhibitors, pigments, heat resistance improvers, flame retardants, and plasticizers.

The silicone rubber composition may be prepared by mixing the components in a conventional manner. The resulting composition is useful as high-voltage electrical insulators. In such applications, the composition may be molded and cured. For molding, any desired method may be selected from prior art well-known methods, for example, compression molding, extrusion molding, injection molding, transfer molding, and casting, depending on composition viscosity, mold size and the like.

In curing the silicone rubber composition, a wide temperature range from room temperature (25° C.±10° C.) to about 250° C. may be employed. In the organic peroxide cure embodiment, it may be typically cured by heating at a temperature equal to or higher than the decomposition temperature of the organic peroxide, preferably 120 to 220° C., and more preferably 150 to 200° C. In the addition reaction cure embodiment, it may be cured by heating at a temperature of preferably 60 to 200° C., and more preferably 80 to 180° C. The curing time (primary cure) may vary with a particular temperature and is typically in a range of 10 seconds to several hours (specifically 1 to 4 hours). At a higher temperature, molding can be completed in a shorter time. Optionally, the product cured under such conditions (primary cure) may be post-cured (secondary cure) at a temperature of 170 to 220° C., preferably 180 to 200° C. for 1 to 6 hours, preferably 2 to 4 hours.

In a second aspect, the invention provides a polymer insulator comprising a core. By molding the silicone rubber composition around the core, an insulating layer is formed on the outer periphery of the core. The core used herein is typically a hollow or solid cylindrical member formed of glass fiber-reinforced plastics (FRP) such as glass fiber-reinforced epoxy resins and glass fiber-reinforced phenolic resins. The thickness of the silicone rubber layer enclosing the outer periphery of the core is not particularly limited as it varies with the size and shape of the polymer insulator (e.g., whether or not sheds are provided, and shape, size and spacing of sheds). For high-voltage electrical insulation, the thinnest portion of the layer is typically at least 1 mm, preferably at least 2 mm. The layer thickness is typically up to 100 mm, preferably up to 50 mm.

EXAMPLE

Examples of the invention are given below by way of illustration and not by way of limitation. All parts are by weight. The "average particle size" of particulate aluminum hydroxide is determined as a weight average diameter $D_{50}$, (i.e., a particle diameter at 50% by weight cumulative, or median diameter) by a particle size distribution measurement meter based on the laser diffractometry. The carbon content on surface is measured by a carbon analyzer.

Example 1

At room temperature, 70 parts of dimethylpolysiloxane (1) endcapped with dimethylvinylsiloxy and having an average degree of polymerization of 500, 30 parts of fumed silica having a BET surface area of 200 $m^2/g$ (Aerosil® 200 by Nippon Aerosil Co., Ltd.), 5 parts of hexamethyldisilazane, 0.5 part of divinyltetramethyldisilazane, and 2.0 parts of water were mixed for 30 minutes. The mixture was heated at 150° C., agitated at the temperature for 3 hours, and cooled to 100° C. To the mixture was added 2.0 parts of trimyristyl alcohol ester of citric acid (m.p. approximately 60° C.). The mixture was agitated for 15 minutes and cooled to room temperature. Further, 70 parts of hexamethyldisilazane-surface-treated aluminum hydroxide having an average particle size of 8 μm and a carbon content of 0.9 wt % and 100 parts of methyltrimethoxysilane-surface-treated aluminum hydroxide having an average particle size of 1 μm and a carbon content of 0.2 wt % were added to the mixture. This was agitated for 15 minutes and run one pass on a three-roll mill, yielding a silicone rubber base.

To the silicone rubber base was added 30 parts of dimethylpolysiloxane (1). Agitation was continued for 30 minutes, after which 3.4 parts (providing a molar ratio of Si—H/alkenyl=1.5) of methylhydrogenpolysiloxane (2) having Si—H groups at both ends and side chains (degree of polymerization 25, Si—H content 0.0048 mol/g) as crosslinker, and 0.05 part of ethynyl cyclohexanol as reaction inhibitor were added. Agitation was continued for 15 minutes, yielding a silicone rubber composition. To the silicone rubber composition was added 0.1 part of platinum catalyst (Pt concentration 1 wt %). It was press cured at 120° C. for 10 minutes into a rubber sheet of 2 mm thick, and post cured in an oven at 200° C. for 4 hours.

The sheet of 2 mm thick was measured for hardness, tensile strength and elongation at break according to JIS K6249, with the results shown in Table 1. Acid resistance was evaluated by the following acid test. A sample of 30 mm squares was cut out of the sheet and measured for initial weight. The sample was immersed in 1N nitric acid at 40° C. for 300 hours, taken out, immersed in deionized water for 24 hours, and vacuum dried. The weight of the sample was measured again, from which a weight loss (%) was calculated as a degree of degradation by acid. The result is also shown in Table 1.

Example 2

To 100 parts of gum-like organopolysiloxane (3) consisting of 99.825 mol % dimethylsiloxane units, 0.15 mol % methylvinylsiloxane units and 0.025 mol % dimethylvinylsiloxy units, endcapped with dimethylvinylsiloxy, and having an average degree of polymerization of ~8,000 were added 5 parts of silanol-endcapped dimethylpolysiloxane having an average degree of polymerization of 10 as dispersant, 5 parts of ethyltrimethoxysilane as surface treating agent, 20 parts of fumed silica having a BET surface area of 200 $m^2/g$ (Aerosil® 200 by Nippon Aerosil Co., Ltd.), 140 parts of aluminum hydroxide having an average particle size of 1 μm (Higilite® H42M by Showa Denko K.K.), and 1.0 part of a mixture of di and mono-esters of stearic/palmitic acid with glycerol (i.e., a mixture of the esterified product of 2 moles of stearic acid and 1 mole of palmitic acid with 1 mole of glycerol and the esterified product of 1 mole of stearic acid and 2 moles of palmitic acid with 1 mole of glycerol, m.p. approximately 55° C.). The components were kneaded on a pressure kneader for 30 minutes, yielding a rubber compound.

A paste was prepared by mixing 2,5-dimethyl-bis(2,5-t-butylperoxy)hexane, organopolysiloxane (3) and fumed silica having a BET surface area of 200 $m^2/g$ (Aerosil® 200 by Nippon Aerosil Co., Ltd.) in a ratio of 40:40:20 wt %. The paste, 1 part, was added to the rubber compound and uniformly dispersed therein on a two-roll mill. The resulting composition was press cured at 165° C. for 10 minutes into a silicone rubber sheet of 2 mm thick and post-cured in an oven at 200° C. for 4 hours.

As in Example 1, the cured sheet was measured for hardness, tensile strength, elongation at break, and acid resistance, with the results shown in Table 1.

Example 3

To 100 parts of rubber-like organopolysiloxane (4) consisting of 99.225 mol % dimethylsiloxane units, 0.75 mol % methylvinylsiloxane units and 0.025 mol % dimethylvinylsiloxy units, endcapped with dimethylvinylsiloxy, and having an average degree of polymerization of ~8,000 were added 40 parts of rubber-like dimethylvinylsiloxy-endcapped organopolysiloxane (5) free of vinyl on side chain and having an average degree of polymerization of ~8,000, 5 parts of silanol-endcapped dimethylpolysiloxane having an average degree of polymerization of 10 as dispersant, 0.2 part of hexamethyldisilazane, 20 parts of fumed silica having a BET surface area of 300 $m^2/g$ (Aerosil® 300 by Nippon Aerosil Co., Ltd.), and 0.5 part of sorbitan tristearate (m.p. approximately 55° C.). These components were mixed at 120° C. for 1 hour. To the mixture were added 40 parts of methyltriethoxysilane-surface-treated aluminum hydroxide having an average particle size of 3 μm and a carbon content of 0.4 wt %, 80 parts of ethyltrimethoxysilane-surface-treated aluminum hydroxide having an average particle size of 12 μm, a carbon content of 0.5 wt % and a vinyl content of 0.0001 mol/g, and 1.9 parts (providing a molar ratio of Si—H/alkenyl=2.0) of methylhydrogenpolysiloxane (6) having Si—H groups at both ends and side chains (degree of polymerization 50, Si—H content 0.0066 mol/g). These components were mixed for 15 minutes on a pressure kneader.

To the rubber compound, 2.0 parts of platinum catalyst C-25A (Pt concentration 0.1 wt %, by Shin-Etsu Chemical Co., Ltd.) was added and uniformly dispersed on a two-roll mill. The composition was press cured at 165° C. for 10 minutes into a silicone rubber sheet of 2 mm thick and post-cured in an oven at 200° C. for 4 hours.

As in Example 1, the cured sheet was measured for hardness, tensile strength, elongation at break, and acid resistance, with the results shown in Table 1.

Comparative Example 1

A silicone rubber sheet was obtained as in Example 1 except that the trimyristyl alcohol ester of citric acid was omitted. As in Example 1, the cured sheet was measured for hardness, tensile strength, elongation at break, and acid resistance, with the results shown in Table 1.

Comparative Example 2

A silicone rubber sheet was obtained as in Example 2 except that 1.0 part of methyl stearate was used instead of the mixture of di and mono-esters of stearic/palmitic acid with glycerol. As in Example 1, the cured sheet was measured for hardness, tensile strength, elongation at break, and acid resistance, with the results shown in Table 1.

Comparative Example 3

A silicone rubber sheet was obtained as in Example 3 except that sorbitan tristearate was omitted. As in Example 1, the cured sheet was measured for hardness, tensile strength, elongation at break, and acid resistance, with the results shown in Table 1.

TABLE 1

|  | Example | | | Comparative Example | | |
| --- | --- | --- | --- | --- | --- | --- |
|  | 1 | 2 | 3 | 1 | 2 | 3 |
| Hardness, Durometer type A | 55 | 64 | 67 | 59 | 65 | 69 |
| Tensile strength (MPa) | 6.0 | 5.8 | 6.8 | 6.5 | 6.0 | 7.0 |
| Elongation at break (%) | 290 | 300 | 350 | 220 | 310 | 330 |
| Weight loss (%) in acid test | 3.5 | 4.1 | 5.8 | 15.8 | 16.6 | 16.1 |

Japanese Patent Application Nos. 2012-088307 and 2012-121485 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone rubber composition for use as high-voltage electric insulator, comprising
    (A) 100 parts by weight of an organopolysiloxane composition of the organic peroxide cure or addition reaction cure type,
    (B) 0.15 to 20 parts by weight of an organic compound having at least two ester groups per molecule and being solid at room temperature (25° C.), and
    (C) 30 to 400 parts by weight of particulate aluminum hydroxide having an average particle size of up to 20 μm.

2. The silicone rubber composition of claim 1 wherein the organic compound (B) is a straight or branched aliphatic or aromatic hydrocarbon compound which may contain an ether bonding oxygen atom (—O—) and may have a hydroxyl group at a molecular side chain or end.

3. The silicone rubber composition of claim 2 wherein the organic compound (B) is an ester of polyhydric alcohol with long-chain carboxylic acid having at least 8 carbon atoms or an ester of polyfunctional carboxylic acid with long-chain alcohol having at least 8 carbon atoms.

4. The silicone rubber composition of claim 1 wherein the organic compound (B) has a melting point of up to 150° C.

5. The silicone rubber composition of claim 1 wherein component (A) is an organopolysiloxane composition of the organic peroxide cure type consisting of (a) 100 parts by weight of an organopolysiloxane having on average at least two alkenyl groups per molecule, represented by the average compositional formula (I):

$$R_a SiO_{(4-a)/2} \qquad (I)$$

wherein R is a substituted or unsubstituted monovalent hydrocarbon group, 0.001 to 10 mol % of R being alkenyl, and at least 90 mol % of R being methyl, and a is a positive number of 1.9 to 2.4, and (b) a catalytic amount of an organic peroxide.

6. The silicone rubber composition of claim 1 wherein component (A) is an organopolysiloxane composition of the addition reaction cure type consisting of (c) 100 parts by weight of an organopolysiloxane having on average at least two alkenyl groups per molecule, represented by the average compositional formula (I):

$$R_a SiO_{(4-a)/2} \qquad (I)$$

wherein R is a substituted or unsubstituted monovalent hydrocarbon group, 0.001 to 10 mol % of R being alkenyl, and at least 90 mol % of R being methyl, and a is a positive number of 1.9 to 2.4, (d) 0.1 to 30 parts by weight of an organohydrogenpolysiloxane having at least two silicon-bonded hydrogen atoms per molecule, and (e) a catalytic amount of an addition reaction catalyst.

7. The silicone rubber composition of claim 1 wherein aluminum hydroxide (C) is surface treated to be hydrophobic prior to or during compounding with component (A).

8. The silicone rubber composition of claim 7 wherein aluminum hydroxide (C) is surface treated to be hydrophobic with an organosilazane and/or organosilane.

9. A polymer insulator comprising a core and a silicone rubber layer formed on the core by molding and curing the silicone rubber composition of claim 1.

* * * * *